United States Patent [19]
Sterzel et al.

[11] Patent Number: 6,027,000
[45] Date of Patent: Feb. 22, 2000

[54] DEVICE FOR PREVENTING ITEMS OF LUGGAGE FROM SLIPPING OR TIPPING IN VEHICLE BOOTS

[76] Inventors: Helmut Walter Sterzel, Waldäckerstrasse 9; Walter Schaffert, Eichenweg 9, both of D-71679 Asperg; Marisa Sollner, Panoramastrasse 3, Heimsheim, all of Germany

[21] Appl. No.: 09/125,991

[22] PCT Filed: Jan. 2, 1997

[86] PCT No.: PCT/EP97/00001

§ 371 Date: Aug. 28, 1998

§ 102(e) Date: Aug. 28, 1998

[87] PCT Pub. No.: WO97/31802

PCT Pub. Date: Sep. 4, 1997

[30] Foreign Application Priority Data

Feb. 29, 1996 [DE] Germany .................... 196 07 600

[51] Int. Cl.⁷ ........................................ B60R 7/02
[52] U.S. Cl. ................. 224/42.33; 224/542; 224/925; 211/182
[58] Field of Search ................. 224/42.33, 925, 224/542; 211/182

[56] References Cited

U.S. PATENT DOCUMENTS 4,684,087  8/1987  Spickard .................. 224/925

*Primary Examiner*—Linda J. Sholl
*Attorney, Agent, or Firm*—Pendorf & Cutliff

[57] ABSTRACT

The invention concerns a device designed to be fitted in vehicle boots to stabilize luggage against slipping and tipping. The device has a base frame (10) and, a certain distance above the base frame (10), an upper frame (12), the two frames being made up of telescoping bars (16, 18) and corner connectors (26) and being connected to each other.

15 Claims, 1 Drawing Sheet

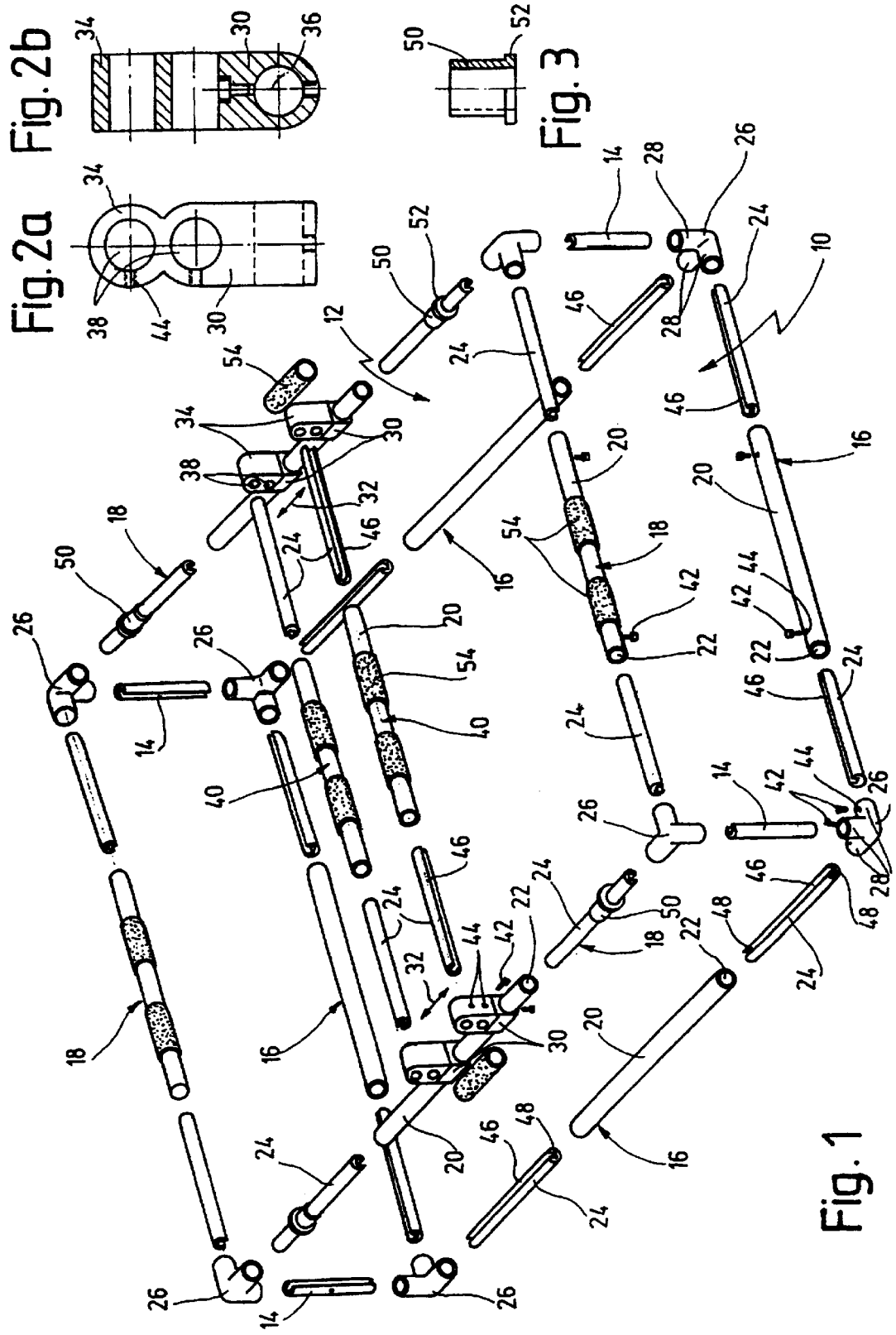

DEVICE FOR PREVENTING ITEMS OF LUGGAGE FROM SLIPPING OR TIPPING IN VEHICLE BOOTS

BACKGROUND OF THE INVENTION

1. Field of the Invention

The invention concerns a device for securing articles of luggage against sliding and tipping in motor vehicle trunks, comprising a quadrilateral base frame for setting upon the floor of a trunk space, of which the frame pieces are assembled from telescopic parts which are insertable into each other, which parts are slideable in their lengthwise direction with respect to each other, and which parts can be securely clamped in place with respect to each other in a defined state of displacement, with spacer arms provided in the area of each of the four frame corners respectively, extending vertically over the base frame plane, with the spacer arms having in their upper area pair-wise joined and essentially parallel to the base frame oriented telescopic bars, and with a least one transverse bar which connects two opposing telescopic bars with each other, which transverse bar is slideable along these telescopic bars and securely clampable thereto.

2. Description of the Related Art

Articles transported in the trunk of a motor vehicle without being secured can, while driving around curves or upon application of brakes, tip over or to slide back and forth in the trunk space. Besides the nuisance of the sounds occurring thereby, the articles themselves or their content can be damaged. Further, there is the danger that the articles freely moveable in the trunk space pose, in the event of a motor vehicle collision, a substantial danger of injury to the persons located within the passenger space of the motor vehicle. In order to minimize these disadvantages, it is already been known to provide a device for preventing items of luggage from slipping or tipping in motor vehicle trunks of the above described type (DE-39 00 112 A1), of which the vertical cross-bars are constructed as telescope tubes and of which the telescope rods are formed as hangers, which bridge over two adjacent cross-bars. The hanger cross-pieces are there connected with each other via at least one telescopable transverse rod, wherein the transverse rod with its ends is slideable along the hanger cross-piece and by means of a releasable tensioning device are clampable thereupon. The telescopic parts of the base frame are pair-wise crosswise or diagonally welded with each other. They are only connectable or fastenable stepwise in various positions which are oriented the same distance from each other. The known device is deficient not only in its complexity of manufacture because of the large number of various parts and various means for connecting the various parts to each other, but also in its manipulability and stability.

SUMMARY OF THE INVENTION

Beginning therewith the invention is concerned with the task of improving the device for employment in a trunk of the above-described type in such a manner, that with a simple as possible manner of construction a stable unit and a flexible adaptation to the most various trunk sizes and various shapes of goods of being transported as possible.

For solution of this task there is proposed in accordance with the present invention, that the telescopic bars are end-wise connected with each other to form an upper frame positioned a spacer-arm-length above base frame that the frame bars of the base frame, the telescopic bars of the upper frame and the transverse bars are constructed identically, and thereby respectively of a central telescope tube into both end openings of which telescope tube telescope rods are introduced and that, in the area of the frame corners of the base frame and the upper frame, corner connectors are provided, which respectively exhibit three perpendicular to each other, one side open-ended tubular segments for receiving respectively one of the free ends of the telescope rods and the spacer bars, which are designed in the manner of a telescope rod.

A preferred embodiment of the invention envisions, that at least two oppositely lying telescopic bars of the upper frame are provided with a slide piece which is longitudinally slideable and rotatable about its sliding axis, which is provided with at least one receptacle opening spaced from, and transverse to, the sliding axis for receiving the free end of a telescope rod of the transverse bar. For production of a reliable clamping connection which is secure against rotation, the telescope rods respectively exhibit a longitudinal groove for the engagement of a clamping screw associated with the telescope tube, the tubular piece of the corner connector, and, in certain cases, on the receptacle part of the slide piece. For simplification of assembly the longitudinal groove, in the area of the end of the telescope rod, is bordered or limited by a stop mechanism or device, so that during release of the clamping screws a telescopic repositioning or displacement is possible without danger of a falling apart of the telescopic parts.

In order to orient the transverse bar also diagonally to the frame bars on the upper frame, according to a preferred embodiment of the invention the receptacle part is provided on the slide piece rotatably about an axis perpendicular to the sliding axis. In order to even further improve the height adjustability of the transverse bars, which is possible by a rotation of the slide piece about its slide axis, the receiving part can be provided with at least two receiving openings which are different distances from the rotation- and sliding-axis of the slide piece, and preferably parallel to each other.

Since the difference in diameter between the central telescope tube and the outer telescope rods can interfere during sliding of the slide piece, it is advantageous to slideably provide on the telescope rod of one of the slide piece bearing telescope rods and adapter housing, of which the outer diameter corresponds to the outer diameter of the adjacent telescope tube. The operability or manipulability during sliding of the slide piece is simplified or facilitated, when the adapter housing on the end opposite to the adjacent telescopic tube exhibits a radially projecting flange, against which the slide piece together with the adapter piece can impact during sliding. A protective covering of an elastomeric material can be slideably provided on one part of the frame bars of the base frame and/or the telescopic bars of the upper frame and/or the transverse bars, which serves the purpose of preventing the occurrence of vibration noises and distributing the load force over a larger surface area.

While the telescopic tubes are preferably constructed as externally coated metal tubes, in particular steel tubes, the telescopic rods can be extruded or continuous cast of metal and the corner connections and/or the slide parts can be formed as shaped parts of metal or reinforced plastic.

BRIEF DESCRIPTION OF THE DRAWINGS

In the following the invention will be described in greater detail by reference to an illustrative embodiment represented schematically in the figures. There are shown FIG. 1 a prospective view of an exploded representation of a storage stabilizing device for employment in the trunk of a motor vehicle;

FIGS. 2a and b a side view and a sectional representation of a slide piece with receptacles for transverse rods;

FIG. 3 a side view of an adapter housing in partial sectional representation.

DETAILED DESCRIPTION OF THE INVENTION

The device shown in the illustration is designed for preventing items of luggage from sliding or tipping in the trunks of motor vehicles. They are comprised essentially of a base frame 10 and, in spaced-apart relation thereto, upper frame 12, which are connected with each other via four segments or spacer arms 14 provided in the area of the frame corners, and oriented perpendicularly or vertically to the frame plane. The frame bars 16, 18 of the base frame 10 and the upper frame 12 are constructed as telescope bars, which are comprised of a central telescope tube 20 and two telescope rods 24 introduced into the end openings 22 of the telescope tube from opposite sides. In the area of the frame corners of the base frame 10 and the upper frame 12 there are provided corner connectors 26, which respectively exhibit three perpendicular to each other, one side openended tubular pieces 28 for receiving respectively one of the three ends of the telescope rods 24 and the spacer element 14 constructed in the manner of the telescope rod 24. On two frame bars 18 of the upper frame 12 oriented opposite to each other there are respectively provided two slide pieces 30 longitudinally slideable in the direction of the double arrow 32 and rotatable about their slide axis. The sliding pieces are provided with receiving part 34 spaced apart and transverse to the sliding axis, which is connected with the slide 30 rotatably about axis 36 perpendicular to the slide axis and which exhibits two receptacle openings 38 positioned at different distances from the slide piece 30. Further, there are provided two telescopic transverse bars 40, which are comprised as the frame bars 16, 18 of a central telescope tube 20 and two telescope rods 24. The free ends of the telescope rods 24 are insertable in respectively one of the receptacle openings 38 of the slide part receptacle part 34 and securable therein.

The telescope tubes 20, the corner connectors 26, and the receptacle parts 34 are provided with clamping screws 42 for securing the telescope rods 24, which are screwed in screw holes 44 of the indicated part, with their shaft introduced in the longitudinal groove 46 of the telescope rod 42 constructed as a profile rod, and which with their tip can be pressed against the base of the groove. The clamping screws 42 together with the longitudinal grooves 46 satisfy therewith at the same time the function of securing against rotation. For assembly simplification the longitudinal grooves 46 of the telescopic rods are limited against inadvertent disassembly or pulling apart while the clamp screws 42 are partially loosened by means of stop bolts 48 in the vicinity of their ends.

On the telescope rods 24 of the slide part 30 bearing frame bars 18 adapter housings 50 are slideably provided, of which the outer diameter corresponds to the outer diameter of the adjacent telescope tube 20 and which on one end exhibit a radially projecting flange 52 for the abutment of the slide part 30. Further casing shaped upholstered bodies 54 of foamed plastic or another elastomeric material are provided on the frame bar 18 and the transverse bar 40, which prevent the occurrence of vibration noises and which distribute the load forces over a broader area.

In summary the following is to be concluded: The invention is concerned with a device for preventing items of luggage from tipping or sliding in a motor vehicle trunk. The trunk device is comprised for this purpose of a base frame 10, an upper frame 12 positioned above the base frame 10, which are assembled from telescopic frame bars 16, 18 and corner connectors 26 connected to each other.

What is claimed is:

1. Device for preventing articles of luggage from sliding or tipping for use in motor vehicle trunks, said device comprising:

quadrilateral base frame (10) comprised of frame bars (16) assembled of telescope parts (20, 24) introducible into each other and slidable in their longitudinal direction with respect to each other, and securely fixable to each other in a defined position of adjustment, one spacer arm (14) provided in the area of each of the four base frame corners, projecting perpendicular over the base frame plane, telescope bars (18) oriented essentially parallel to the base frame (10) and pair-wise connected to each other at their ends in the area of the upper ends of the space arms (14) to form upper frame (12) positioned at spacer arm length separation from the base frame (10), at least one telescopic transverse bar (40) connecting two opposite telescopic bars (18) to each other and displaceable along the telescopic bars (18) and on this securely clampable, wherein the frame bars (16) of the base frame, the telescopic bars (18) of the upper frame and the transverse bar (40) respectively are comprised of a central telescope tube (20) with two telescope rods (24) introduced into the end openings of the telescope tube (20) from opposite sides, and wherein in the the area of the frame corners of the base frame (10) and the upper frame (12) corner connectors (20) are provided, which respectively comprise three perpendicular to each other, one side open-ended tubular pieces (28) for receiving respectively one of the three ends of the telescope rods (24) and the spacer element (14) constructed in the manner of the telescope rod (24).

2. Device according to claim 1, wherein a slide part (30) is provided longitudinally slideable and rotatable about its slide axis on at least two opposite telescope bars (18) of the upper frame (12), each of said slide parts (30) having a receiving part (34) projecting perpendicularly to the slide axis, said receiving part (34) having at least one receptacle opening (38) for the free end of a telescope rod (24) of the transverse bar (40).

3. Device according to claim 1, wherein the telescope rod (18) exhibits a longitudinal groove (46) for the engagement of a clamping screw (42) screwed in from the telescope tube (20), the tubular piece (28), or the corner connector (26) and optionally on the receiving part (34) of the slide part (30).

4. Device according to claim 3, wherein said longitudinal groove (46) is limited by a limiting means (48) in the vicinity of the telescope rod end.

5. Device according to claim 2, wherein said receiving part (34) is provided on the slide part (30) rotatably about an axis (36) perpendicular to the slide axis.

6. Device according to claim 2, wherein the receiving part (34) has at least two receiving openings (38) at different distances from the rotation and slide axis of the slide part (30).

7. Device according to claim 6 wherein said receiving openings (38) are parallel to each other.

8. Device according to claim 2, wherein on the telescope rod (24) of one of the slide part (34) bearing telescopic bars (18) an adapter housing (50) is slideably provided, of which the outer diameter corresponds to the outer diameter of the adjacent telescope tube (20).

9. Device according to claim 8, wherein the adapter housing (50) is provided with a radially projecting flange (52) on the end of said housing opposite the adjacent telescope tube.

10. Device according to claim 1, wherein padding (54) of an elastomeric material is slideably provided on at least one part of the frame bar (16) of the base frame (10) and/or the telescope bar (18) of the upper frame (12) and/or the transverse bar (40).

11. Device according to claim 1, wherein said telescope tube (20) is constructed of a metal tube having a coated outer surface.

12. Device according to claim 11, wherein said metal tube is a steel tube.

13. Device according to claim 1, wherein said telescope rod (24) is formed of extruded or continuous cast metal.

14. Device according to claim 13, wherein metal is aluminum.

15. Device according to claim 1, wherein said corner connectors (26) and/or the components of the slide (30) are formed as shaped parts of metal or reinforced plastic.

* * * * *